United States Patent [19]

White et al.

[11] Patent Number: 5,672,558

[45] Date of Patent: Sep. 30, 1997

[54] FORMED COMPOSITIONS

[75] Inventors: James F. White, Hudson; Jeffrey J. Ramler, Cleveland Heights, both of Ohio

[73] Assignee: Engelhard Corporation, Iselin, N.J.

[21] Appl. No.: 643,494

[22] Filed: May 6, 1996

Related U.S. Application Data

[63] Continuation of Ser. No. 423,625, Apr. 17, 1995.

[51] Int. Cl.[6] .................................................. B01J 21/06
[52] U.S. Cl. ........................................................... 502/349
[58] Field of Search ............................................... 502/349

[56] References Cited

U.S. PATENT DOCUMENTS

| | | | |
|---|---|---|---|
| 0,510,772 | 10/1893 | Shell Inter Research . | |
| 3,067,127 | 12/1962 | Plank et al. | 208/110 |
| 4,061,596 | 12/1977 | Matsushita et al. | 252/463 |
| 4,472,530 | 9/1984 | Lewis et al. | 502/236 |
| 5,217,938 | 6/1993 | Reinalda et al. | 502/325 |
| 5,269,990 | 12/1993 | Khare et al. | 264/63 |

FOREIGN PATENT DOCUMENTS

| | | | |
|---|---|---|---|
| 0167324A2 | 1/1982 | European Pat. Off. | C01B 33/12 |
| 0309048A1 | 3/1989 | European Pat. Off. | B01J 21/08 |
| 0428223a1 | 5/1991 | European Pat. Off. | B01J 21/06 |
| 0509625A2 | 10/1992 | European Pat. Off. | C04B 35/00 |
| 2590887 | 12/1985 | France | C01G 25/02 |

OTHER PUBLICATIONS

Yamaguchi, T. in "Application of $ZrO_2$ as a Catalyst and a Catalyst Support" in Catalysis Today 20 1994 (199–218) Elsevier Science Publishers B.V.

*Primary Examiner*—Glenn A. Caldarola
*Assistant Examiner*—Alexander G. Gmyka
*Attorney, Agent, or Firm*—Raymond F. Keller

[57] ABSTRACT

A process is disclosed for the preparation of formed Group IVB metal oxide compositions suitable for use as catalyst supports which comprises: A) preparing a paste comprising (i) one or more calcined Group IVB metal oxides, (ii) at least one solvent and (iii) at least one acid; B) forming a shaped particle from said paste; and C) drying and calcining said shaped particle. Also disclosed are formed compositions prepared by the foregoing process and catalysts where the formed compositions incorporate therein or have supported thereon catalytically active materials.

12 Claims, No Drawings

FORMED COMPOSITIONS

This is a continuation of application Ser. No. 08/423,625 filed Apr. 17, 1995.

BACKGROUND OF THE INVENTION

1. Field of the Invention

This invention relates to a novel process for the preparation of formed Group IVB (titanium, zirconium and hafnium) metal oxide compositions suitable for use as catalyst supports, the formed compositions prepared by this process and catalysts where the formed compositions incorporate therein and/or have supported thereon catalytically active materials.

2. Description of Related Art

Processes for the preparation of Group IVB metal containing compositions have been described in the prior art. For increased strength and durability, such compositions incorporate mineral binders such as silicas, aluminas and clays, or stabilizers such as oxides of Ca, Y and Mg.

The prior art includes, for example, French Publication No. 2,590,887 which describes a composition based on zirconium oxide having a specific surface area stabilized at high temperature and method of preparation. The composition described is one which contains zirconium oxide and an additive constituted by at least one of the oxides of the elements chosen from the group constituted by silicon, the rare earths, aluminum, silicon and yttrium.

European patent application 0 428 223 A1 describes a process for the preparation of extrudates suitable for use in the manufacture of catalysts or catalyst carriers, especially Fischer-Tropsch catalysts, comprising mulling a mixture of finely divided silica, a water soluble compound derived from a metal selected from Group IVB of the Periodic Table and water, the mixture having a solids content of 20 to 50% by weight, and extruding the mixture. After drying and/or calcining, the extrudates may be impregnated with one or more suitable metal compounds, optionally followed by drying, calcination and/or activation, and used as a catalyst.

U.S. Pat. No. 5,217,938 describes a zirconia-based catalyst prepared by mulling a mixture of a zirconia source and a solvent, which has a solids content of from 20% by weight to 60% by weight and extruding the mixture.

There is still a need, however, for improved Group IVB metal oxide compositions suitable for use in the preparation of catalysts, which are hard, porous and have low density and which are preferably free of added mineral binders and metal-containing stabilizers.

SUMMARY OF THE INVENTION

This invention relates to a process for the preparation of formed Group IVB metal oxide compositions, the compositions prepared by this process and the catalysts incorporating said compositions.

In one embodiment, this invention relates to a process for the preparation of formed Group IVB metal oxide compositions suitable for use as catalyst supports which comprises:

A) Preparing a paste comprising i) one or more calcined Group IVB metal oxides, ii) at least one solvent and iii) at least one acid;

B) Forming a shaped particle from said paste; and

C) Drying and calcining said shaped particle.

In another embodiment, this invention relates to compositions prepared by the foregoing process and catalysts prepared therefrom.

DESCRIPTION OF THE PREFERRED EMBODIMENT

As previously stated, this invention provides a process for preparing formed Group IVB metal oxide compositions suitable for use as catalyst supports. The compositions of this invention are preferably free of mineral binders such as aluminas, silicas and clays and/or metal-containing stabilizers such as yttria, magnesia, calcia and ceria.

As used herein "free of mineral binders and metal-containing stabilizers" shall mean that such materials, if present, will not materially affect the physical and chemical characteristics of the compositions prepared according to this process when compared to those which are completely free of such materials. The compositions of this invention may also contain other impurities such as small amounts of sulfur, aluminum, silicon and alkali and/or alkaline earth metals. The source of any impurities is typically from the zirconia raw material. If mineral binders and/or stabilizers and/or other impurities are present in the formed compositions of this invention, such compositions shall be considered free of such impurities for the purposes of this invention if they are present in amounts not greater than about 2% by weight, preferably not greater than 0.3% by weight; and more preferably not greater than 0.1% by weight of the formed Group IVB metal oxide composition.

The metal oxides useful for the purposes of this invention are the oxides of titanium, zirconium and hafnium or mixtures of one or more of these Group IVB metal oxides. The term "calcined Group IVB metal oxides" as used in this invention shall mean the metal oxides or their hydrated precursors have been calcined at from about 600° C. up to 1100° C. Preferably, calcination for the purposes of the calcined Group IVB metal oxides of this invention is at a temperature of from about 650° C. up to about 900° C., more preferably from about 700° C. up to about 900° C., for a period of time sufficient to remove substantially all of the water of hydration associated with these metal oxides. This period of time is typically the amount of time it takes for the oxide to reach a constant weight under calcination conditions; typically, for a period of from about two hours to about 12 hours.

The calcined metal oxides used in the process of the instant invention are typically in a physical form suitable for the formation of shaped particles; preferably the calcined metal oxides used herein are in powdered form.

The process of this invention also includes the use of one or more solvents selected from conventional liquid solvents which are inert in the context of the process of the instant invention and easily removed by drying (evaporation) and/or by combustion during calcination. These solvents include, but are not limited to, water, alcohols, such as methanol, ethanol and propanol; ketones, such as acetone and methyl ethyl ketone; aldehydes, such as propanal and butanal; and aromatic solvents, such as toluene and benzene. In a preferred embodiment, water is used as the solvent.

The amount of solvent used in preparing the paste in the instantly claimed process is an amount that provides a consistency which allows for a shape to be mechanically formed out of said paste, but not so fluid as to fail to hold the formed shape or become sticky and agglomerate with other particles. Typically, the total amount of solvent in the paste including that contributed by the acid component is from about 1.0% up to about 30% by weight of the paste; preferably from about 5% up to about 25% by weight of the paste.

The acids useful for the purposes of this invention may be organic acids, inorganic acids or mixtures thereof. Organic acids include, for example, formic acid, acetic acid, maleic acid, malonic acid, lactic acid, gluconic acid, propionic acid, butanoic acid, oxalic acid, gallic acid, picric acid or chloroacetic acid. The inorganic acids include sulfuric acid, fluorosulfuric acid, hydrochloric acid, phosphoric acid, hydrofluoric acid and nitric acid. Typically, the acid or combination of acids are present in an amount sufficient to peptize the one or more calcined Group IVB metal oxides and typically is present in an amount up to about 10% by weight of the paste; preferably from about 2% by weight up to about 7% by weight.

The paste of the instant process may also contain rheology control agents and pore forming agents. Rheology control agents include starches, sugars, glycols, polyols, powdered organic polymers, graphite, stearic acid and its esters. Pore forming agents include graphite, polypropylene or other organic polymer powders, activated carbon, charcoal, starches and cellulose flour. The rheology control agents and pore forming agents (some materials may perform both functions) are well known to those of ordinary skill in the art and are used as necessary to obtain the desired viscosity of the paste or porosity of the formed particle as the case may be. Typically, any of these may be present in an amount of from about 0.5% up to about 20% by weight, preferably from about 1% up to about 10% by weight of the paste.

In the normal course of preparing the formed Group IVB oxide supports, any pore former or rheology control agent which is incorporated will be removed from the finished product by a combination of volatilization and combustion during the final steps of drying and calcination of the formed shape. However, it is also well-known to those skilled in the art that it is preferred to use only the minimum amounts of pore former and rheology control agents which are necessary to accomplish the desired results. It is also known that the preferred amount of pore former and rheology control agents usually must be arrived at by experimentation. This is because normally the optimum amount for any individual application will vary depending on the other components present and especially may depend on the type of acid used to effect peptization of the powdered oxide ingredients. If excessive amounts of these agents are incorporated, the finished formed product may be too weak or soft to be practical as a catalyst support.

It is contemplated that the formed Group IVB metal oxide compositions of the instant invention may also contain incorporated therein or supported thereon catalytically active components or promoter materials which promote the catalytic activity of the catalytically active components. When all or a portion of the desired catalytically active component and/or promoter material is incorporated in the formed Group IVB metal oxide compositions, the paste prepared in step (A) further comprises at least one catalytic component and/or promoter material. Suitable catalytic components and promoter materials and amounts used are described herein below.

The calcined Group IVB metal oxide, solvent, acid and optional rheology control, pore forming agents, catalytic component and/or promoter materials are mixed or mulled thoroughly for a period of time sufficient to provide uniform mixing and peptization of the components. This time can vary from a few minutes to several hours. Preferably, the mixture is mixed or mulled for a total period of from about 10 minutes to about 120 minutes, more preferably from about 15 minutes up to about 90 minutes. This is typically carried out at room temperature at or about atmospheric pressure. A formed particle is then prepared from the paste. Extrusion is the preferred forming technique and typically the formed shape is a cylinder, although the formed shape may also have trilobed or star shaped cross sections, etc. The formed particle is then dried to remove the bulk of the solvent from said particle. Optimally, the formed particle may be aged before drying for one to 72 hours, preferably, 8 to 24 hours. If aging is conducted, room temperature conditions are preferred. Typically, drying is done at a temperature of from about 80° up to about 150° C. in air for a period of up to about five hours, preferably from about one-half hour up to about three hours or long enough to reach a constant at the temperature of drying. The particle is then calcined in air or inert gas for a period of time ranging from about an hour up to about 12 hours, preferably two to eight hours at a temperature of from about 400° C. up to about 1100° C., preferably about 600° C. to about 850° C. The result is an unexpectedly hard, porous, and low density formed Group IVB metal oxide particle. In the context of this invention a particle typically has a radial, or side crush strength of greater than about 2.0 lbs./mm of particle length, a porosity typically between 0.15 cc/gm and 0.35 cc/gm and an apparent bulk density typically less than about 1.4 gms/cc. When used herein, Crush Strength is radial, or side, crush strength as determined by the method ASTM-4179-82, porosity ($H_2O$ pore volume) is defined in ASTM D-3766-86 and is determined by a modification of ASTM C-948-81 wherein the particles are soaked in deionized water for a period of 30 to 60 minutes instead of the 24 hours specified; and apparent bulk density (ABD) is determined by the method of ASTM D-4180-82.

The formed compositions may have mineral binders and/or metal containing stabilizers incorporated therein to further improve the hardness of said composition. As previously discussed, preferably the compositions are free of mineral binders and/or metal-containing stabilizers.

Once the formed compositions of this invention are prepared and calcined, a source of one or more catalytically active components or promoter materials for the catalytically active components can be deposited on them. Catalytically active components include those chosen from the elements of Groups IB through VIIB and VIII of the Periodic Table of Elements, the Group VIII elements being preferred. Sources containing $H_3PO_4$, $H_2SO_4$, iron, chromium, manganese, ruthenium, cobalt, rhenium, nickel, rhodium, palladium, platinum, vanadium, molybdenium, tungsten, copper and zinc are especially preferred. Any promoter compatible with the catalytically active component may also be deposited on the catalyst.

Examples of catalyst and promoter pairs are copper as promoter for chromium; sodium and/or other alkali metals as promoter for chromium; zinc as promoter for copper; nickel or cobalt as promoter for molybdenum; platinum or rhodium as promoter for palladium; copper, silver or gold as promoters for palladium; silica as promoter for alumina and boron, tellurium or tin as promoter for platinum.

In cases in which a source of a catalytically active component or promoter material is included in the support additional sources of such components or materials can be deposited on the formed composition.

The source of the catalytically active components or promoter materials can be deposited on the support by any of the techniques known in the art. The deposition can be accomplished in either one or more steps with the order in which multiple sources of catalytically active components or promoter materials are deposited being largely a matter of choice and convenience. However, the preferred order is to first deposit the source of the one or more promoter materials on the formed composition followed by the source of one or more catalytically active components.

Impregnation is the preferred technique for deposition. When impregnation is utilized, the deposition can be effected by contacting the formed composition with the source of the desired catalytically active component or promoter material in the presence of a liquid. Suitable liquids for use in impregnation include both organic and inorganic liquids, with water, aqueous ammonia, or aqueous acids being the preferred liquids. Suitable sources of catalytically active components include both organic and inorganic compounds. Inorganic compounds are preferable, with nitrates being the most preferred inorganic compounds including for example, Cobalt II nitrate hexahydrate, $Co(NO_3)_2.6H_2O$; nickel II nitrate hexahydrate, $Ni(NO_3)_2.6H_2O$; iron III nitrate hexahydrate $Fe(NO_3)_3.6H_2O$; chromium oxide, $CrO_3$; sodium palladium chloride, $Na_2PdCl4$; chloroplatinic acid, $H_2PtCl_6$; tetraaminepalladium chloride, $Pd(NH_3)_4Cl_2$; ruthenium chloride, $RuCl_3$; copper nitrate tetrahydrate, $Cu(NO_3)_2.4H_2O$; tin chloride, $SnCl_4$; sodium hydroxide, NaOH; Boric Acid, $H_3BO_3$; zinc nitrate tetrahydrate, $Zn(NO_3)_2.4H_2O$; silver nitrate, $AgNO_3$; chloroauric acid, $HAuCl_4$; and chloroplatinic acid, $H_2PtCl_6$. Also, as appropriate within the context of this invention, the foregoing are suitable examples of sources of promoter materials.

The catalytically active component, if present, may be present in an amount of from about 1 part to about 100 parts by weight, preferably from about 5 parts to about 25 parts by weight, per 100 parts by weight of the formed Group IVB metal oxide composition. The promoter, if present, can be present in an amount of from about 0.1 parts to about 60 parts by weight, preferably from about 2 parts to about 40 parts by weight, per 100 parts by weight of the formed Group IVB metal oxide composition.

The formed compositions are typically dried and calcined or reduced after each catalytically active component or promoter element of the catalytically active component is deposited. The final product, which may be in reduced or oxide form, can be applied in any process in which a Group IVB based catalyst can be used or is required. For example, hydrogenation, amination, alkylation, polymerization, condensation, oxidation, dehydrogenation, hydrocracking, NOx reduction, ozone decomposition and $N_2O$ decomposition processes.

Examples of this invention are included herein below. Of course, these examples are not intended as limiting this invention as modification of the examples by ordinary expedient will be readily apparent to those of ordinary skill in the art.

Unless otherwise indicated in the following examples and elsewhere in the specification and claims, all parts and percentages are by weight, temperatures are in degrees centigrade and pressures are at or near atmospheric.

EXAMPLE 1

A calcined zirconium oxide is prepared by heating in a forced air oven zirconium hydroxide (commercially available from Magnesium Electron, Inc. having a zirconium content of nominally 77% by weight as $ZrO_2$ and an average particle size of 15 microns) from room temperature to 850° C. at a rate of 2.4° C. per minute and then calcining at 850° C. for 8 hrs.

EXAMPLE 2

To a Littleford brand mixer are added 1500 parts of calcined zirconium oxide prepared according to Example 1, 72.9 parts of 37% aqueous hydrochloric acid, 37.5 parts of 71% aqueous nitric acid, 75 parts of Zusoplast PS1 (a polysaccharide high polymer powder commercially available from Zschimmer & Schwarz GmbH & Co. having a viscosity (1% aqueous solution) at 25° C. of nominally 4500 mPa.s) and 450 parts of water. These components are mixed for about 30 minutes to produce a uniform peptized mixture. This mixture is extruded into 1/16" cylinders on a 2" Welding Engineer's extruder through a 1" thick 38 hole die plate. These extrudates are aged at room temperature for about 12 hours. The aged extrudates are dried in a forced air oven at 100° C. for 2 hours followed by heating the extrudate to 850° C. at a rate of 2.3° C. per minute and calcining at 850° C. for 8 hours to yield the desired zirconium oxide support.

EXAMPLE 3

To a Littleford brand mixer are added 1500 parts of calcined zirconium oxide prepared according to Example 1, 142 parts of the 37% aqueous hydrochloric acid, 75 parts of Zusoplast PS1 described in Example 2 and 500 parts of water. These components are mixed for about 30 minutes to produce a uniform peptized mixture. This mixture is extruded into 1/16" cylinders on a 2" Welding Engineer's extruder through a 1" thick 38 hole die plate. These extrudates are aged at room temperature for about 12 hours. The aged extrudates are dried in a forced air oven at 100° C. for 2 hours followed by heating to 850° C. and calcining at 850° C. for 8 hours to yield the desired zirconium oxide support.

EXAMPLE 4

A zirconia oxide support is prepared according to the procedure of Example 2, except that 150 parts (instead of 75 parts) of Zusoplast PS1 is added to the Littleford mixture and the extrudates are dried at 100° C. for 16 hours instead of 2 hours.

EXAMPLE 5

To a Littleford brand mixer are added 3000 parts of calcined zirconium oxide prepared according to Example 1 and 127 parts of 71% aqueous nitric acid in 250 parts of water. These components are mixed for about 10 minutes and an additional 250 parts of water is added and then mixed for another 10 minutes. To this mixture 150 parts of Zusoplast PS1, described in Example 2, and 400 parts of water are added and mixing is then continued for an additional 15 minutes. The resulting mixture is extruded into 1/8" cylinders on a 1" hydraulic Bonnot extruder through 1/4" thick die plate. The extrudates are broken up and divided in half. One-half is re-extruded into 1/16" cylinders on a 1" hydraulically driven Bonnot extruder through a 1/4" thick dieplate. The other half is re-extruded into 1/16" trilobes on a 1" Bonnot extruder through a 1/8" thick 6 hole dieplate. These extrudates are aged at room temperature for about 12 hours. The aged extrudates are dried in a forced air oven at 100° C. overnight followed by heating to 850° C. at a rate of 2.3° C. per minute and calcining at 850° C. for 4 hours to yield the desired zirconium oxide supports.

EXAMPLE 6

To a Littleford brand mixer is added 600 parts of calcined titanium oxide (calcined in air for 6 hours at 800° C.) and 19 parts of 71% aqueous nitric acid diluted in 200 parts of water. These components are mixed for about 10 minutes and 30 parts of Zusoplast PS1 described in Example 2 and 70 parts of water are added. These components are mixed for 10 additional minutes to produce a uniform peptized mixture. This mixture is extruded into ⅛" cylinders on a 1" Bonnot extruder through a ¼" thick dieplate. The wet extrudates are broken up and re-extruded into 1/16" trilobes on a 1" hydraulic Bonnot extruder through a ⅜" thick 6 hole dieplate. These extrudates are aged at room temperature for about 12 hours. The aged extrudates are dried in a forced air oven at 100° C. for 2 hours followed by heating to 900° C. at a rate of 2.3° C./minute and calcining at 900° C. for 4 hours to yield the desired titanium oxide support.

Comparative Example A

To an Eirich brand mixer are added 1,500 parts of a zirconium carbonate (commercially available from Magnesium Elektron as a paste containing 40% solids as $ZrO_2$) and 214 parts of 71% aqueous nitric acid. These components are mixed for thirty minutes and then 75 parts of Zusoplast PS1 identified in Example 2 are added to the mixer. These components are mixed for 10 minutes to produce a uniform peptized mixture. This mixture is extruded into ⅛" cylinders on a 2" Welding Engineer's extruder through a 1" thick dieplate. These extrudates are aged at room temperature for 12 hours. The aged extrudates are dried overnight at 100° C. and then calcined at 500° C. for 2 hours.

Comparative Example B

To a Littleford brand mixer are added 1839 parts zirconium carbonate containing 40% solids as $ZrO_2$, 250 parts zirconium oxynitrate commercially available from MEI, 125 parts of silica powder commercially available from Cabot Corporation under the name Cab-O-Sil HS-5 amorphous fumed silica powder, 90 parts of methyl cellulose and 20 parts of water. To these components are added a mixture of 12 parts of polyethylene glycol commercially available from J. T. Baker as a semi-viscous liquid with a molecular weight of 400 and 100 parts of water and then mixed for fifteen minutes. To this mixture 23 parts of Zusoplast PS1, described in Example 2, are added and mixing continued for an additional 10 minutes to produce a uniform peptized mixture. The mixture is dried overnight at room temperature then extruded into ⅛" cylinders on a 2" Welding Engineer's extruder through a 1" thick dieplate. The extrudates are calcined at 500° C. for 2 hours using a 2° C./min ramp rate for heating from room temperature to 500° C.

TABLE

| Example No. | Crush Strength (lbs/mm) | ABD Kg/l | $H_2O$ Pore Vol cc/g |
|---|---|---|---|
| 2 | 3.6 | 1.24 | 0.23 |
| 3 | 4.1 | 1.24 | 0.28 |
| 4 | 4.3 | 1.11 | 0.23 |
| 5 | 3.1 | 1.18 | 0.24 |
| 6 | 4.9 | 1.03 | 0.26 |
| A | Soft (<2 lbs/mm) | not measured | |
| B | 2.5 | not measured | |

As can be seen from the foregoing table, examples 2–6 prepared according to the instant invention using calcined Group IVB metal oxides resulted in particles having crush strengths in excess of 3 lbs/mm. Comparative Example A uses an uncalcined Zirconium source and the resulting product has a crush strength of less than 2. Comparative Example B demonstrates that the particles formed from the same uncalcined zirconium source as A resulted in particles having a crush strength of 2.5 when silica powder is incorporated as a binder. It is apparent that the compositions of this invention can achieve greater crush strength without the need for such additional binders.

EXAMPLE 7

To a Littleford brand mixer are added 2,925 parts of calcined zirconium oxide prepared according to Example 1, 127 parts of 71% aqueous nitric acid, and 1200 parts of water. These components are mixed for ten minutes and then 61 parts of cobalt hydroxide (61.5% cobalt), 61.5 parts of nickel hydroxide (61% nickel) and 150 parts of Zusoplast PS1 described in Example 2 are added. The mixing is continued for an additional 20 minutes to form a uniform peptized mixture. This mixture is extruded through a ¼" thick stainless steel die plate on a 1" Bonnot extruder having ⅛" inch holes. The wet cylindrical extrudate is then re-extruded through a ⅜" thick aluminum die plate having 1/16" trilobed shaped holes to produce a trilobe shaped product. The trilobes are aged at room temperature for 36 hours, then dried at 100° C. for four hours and calcined at 600° C. for four hours in air to yield the desired co-extruded Co—Ni-zirconia catalyst.

EXAMPLE 8

The procedure for Example 7 is repeated except that no Zusoplast is added and the component amounts used are as follows:

Calcined Zirconium oxide, 880 parts; cobalt hydroxide, 97.6 parts; nickel hydroxide, 98.4 parts; 71% nitric acid solution, 42 parts; and water, 250 parts. The resulting co-extruded Co—Ni-zirconia catalyst has a crush strength of 4.3 lbs./mm and an apparent bulk density of 1.29 gm./cc.

EXAMPLE 9

A solution of 195.6 parts of ferric nitrite nonahydrate, commercially available from EM Scientific having an Fe content of 13.8%, dissolved in 250 parts of water is sprayed onto the 1/16" trilobe zirconium oxide extrusion prepared in Example 5 in three portions with drying between each portion. After the last portion is sprayed onto the zirconia extrusion and dried at 75° C., for two hours, the iron impregnated zirconia is heated to 550° C. at a rate of 1.75° C./minute and calcined at 550° C. for 1½ hours in air. The nominal composition of the finished product is 12.5% ferric oxide and 87.5% of zirconium oxide. This catalyst is effective for the decomposition of hydrogen peroxide in aqueous waste streams as demonstrated by the following test: A solution of $H_2O_2$ in water having a $H_2O_2$ concentration of 10% by weight is prepared and 200 parts of this solution is contacted with two parts of the iron on zirconia catalyst of this example. The catalyst and the solution is stirred mechanically for 20 minutes, after which time no $H_2O_2$ is detected in the solution when tested with KI and starch solution, indicating complete decomposition of the $H_2O_2$.

EXAMPLE 10

A solution of 25.9 parts of cobalt nitrate hexahydrate and 25.9 parts of nickel nitrate hexahydrate plus enough water to bring the total solution volume to 49 cc. is prepared and sprayed onto 200 parts of the 1/16" trilobe zirconium oxide extrudates prepared in Example 5. After all of the cobalt plus nickel nitrate solution is sprayed onto the zirconium oxide, the product is aged at room temperature for one hour and then dried with hot air from a heat gun. The cobalt and nickel containing zirconium oxide is then calcined for 1.5 hours at 550° C. in air to yield a catalyst whose composition is nominally 1.25% cobalt, 1.25% nickel and 97.5% zirconium oxide. This catalyst is effective for the decomposition of both hydrogen peroxide and hypochlorite in aqueous streams. To test this catalyst for $H_2O_2$ decomposition, the procedure described in Example 9 resulted in all the $H_2O_2$ decomposing within 5 minutes. To test this catalyst for the decomposition of hypochlorite, 200 parts of commercial sodium hypochlorite (chlorox) is contacted with two parts of the catalyst of this example, otherwise the procedure for $H_2O_2$ decomposition described in Example 9 is repeated. No hypochlorite was observed after thirty minutes of contact.

What is claimed is:

1. A process for the preparation of formed Group IVB metal oxide compositions which comprises:

A) preparing a paste comprising i) one or more calcined Group IVB metal oxides, ii) at least one solvent and iii) at least one acid;

B) forming a shaped particle from said paste; and

C) drying and calcining said shaped particle.

2. A process according to claim 1, wherein said paste is free of mineral binders and metal-containing stabilizers.

3. A process according to claim 1, wherein said paste further contains a rheology control agent.

4. A process according to claim 1, wherein said paste further contains a pore forming agent.

5. A process according to claim 1, wherein said solvent is water.

6. A process according to claim 1, wherein said acid is a mineral acid.

7. A process according to claim 1, wherein said particle is formed by extrusion.

8. A process according to claim 1 wherein said paste further comprises iv) at least one catalytically active component.

9. A process according to claim 1 wherein the shaped particle formed in step (B) is aged for a period of time up to about 24 hours before the drying and calcining of step (C).

10. A composition prepared by the process according to claim 1.

11. A catalyst composition wherein catalytically active components are deposited on the composition of claim 10.

12. A catalyst composition prepared by the process of claim 8.

* * * * *

UNITED STATES PATENT AND TRADEMARK OFFICE
CERTIFICATE OF CORRECTION

PATENT NO. : 5,672,558
DATED : September 30, 1997
INVENTOR(S) : James F. White, Jeffrey J. Ramler It is certified that error appears in the above-identified patent and that said Letters Patent is hereby corrected as shown below:

Column 9,
Lines 16-17, delete "one or more calcined Group IVB metal oxides" and insert
-- calcined zirconium oxide --.

Signed and Sealed this

Eighteenth Day of September, 2001

Attest:

NICHOLAS P. GODICI
Attesting Officer
Acting Director of the United States Patent and Trademark Office